(12) United States Patent
Li et al.

(10) Patent No.: US 11,709,340 B2
(45) Date of Patent: Jul. 25, 2023

(54) OPTICAL IMAGING LENS ASSEMBLY INCLUDING SEVEN LENSES OF −++−++−, +++−++−, −−+−++−, −++−+−− OR +++−+++ REFRACTIVE POWERS

(71) Applicant: Zhejiang Sunny Optical Co., Ltd, Ningbo (CN)

(72) Inventors: Long Li, Ningbo (CN); Xiaoting Geng, Ningbo (CN); Dawei Tang, Ningbo (CN); Fujian Dai, Ningbo (CN); Liefeng Zhao, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 310 days.

(21) Appl. No.: 16/925,317

(22) Filed: Jul. 9, 2020

(65) Prior Publication Data

US 2021/0055517 A1    Feb. 25, 2021

(30) Foreign Application Priority Data

Aug. 20, 2019    (CN) .......................... 201910768647.1

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 4,976,525 A | 12/1990 | Matsumura et al. | |
| 9,874,725 B2 | 1/2018 | Lai et al. | |
| 2019/0353874 A1* | 11/2019 | Yeh | G02B 13/0045 |
| 2021/0048643 A1* | 2/2021 | Lin | G02B 13/18 |
| 2021/0088755 A1* | 3/2021 | Nitta | G02B 13/18 |

\* cited by examiner

*Primary Examiner* — Wen Huang
(74) *Attorney, Agent, or Firm* — Barnes & Thornburg LLP

(57) ABSTRACT

The present disclosure discloses an optical imaging lens assembly including a first lens; a second lens with a convex object-side surface and a concave image-side surface; a third lens having a positive refractive power with a convex object-side surface; a fourth lens having a negative refractive power with a concave object-side surface; a fifth lens; a sixth lens with a convex object-side surface and a concave image-side surface, and at least one of the object-side surface and the image-side surface thereof having an inflection point; and a seventh lens having a refractive power with a convex object-side surface and a concave image-side surface, and at least one of the object-side surface and the image-side surface thereof having an inflection point, wherein a total effective focal length f and a radius of curvature R11 of the object-side surface of the sixth lens satisfy $1.00 < f/R11 < 2.50$.

18 Claims, 9 Drawing Sheets

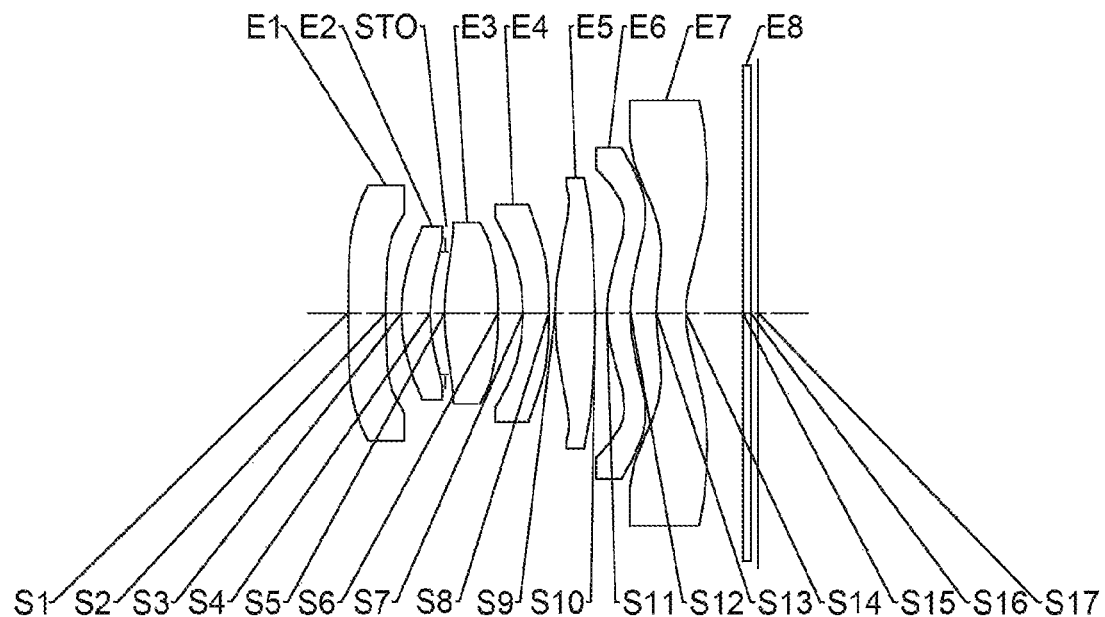
Fig. 5
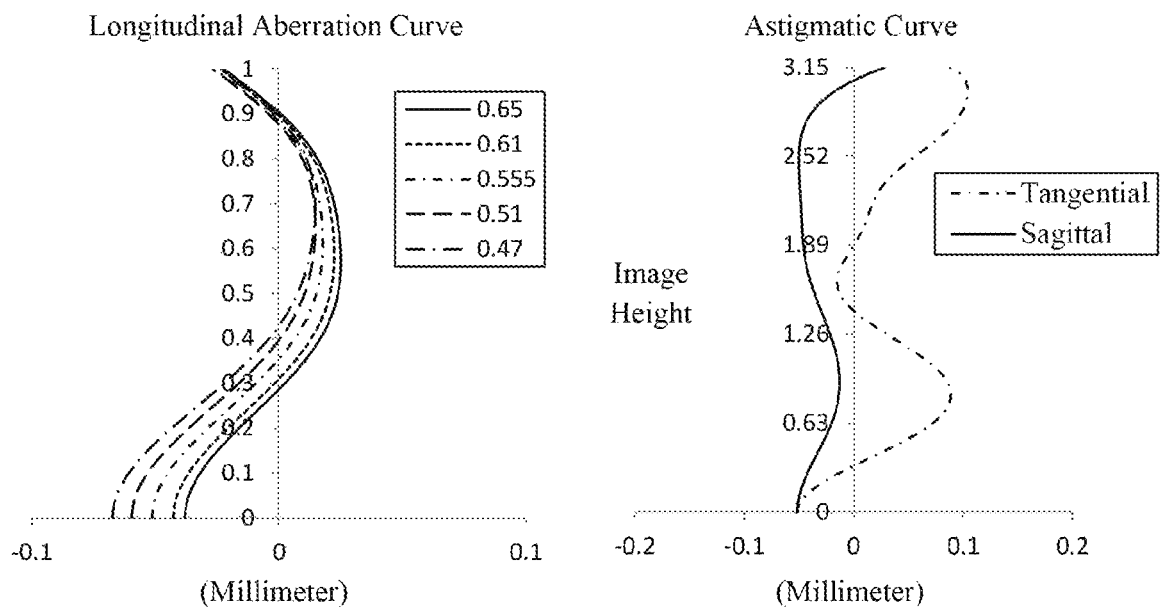
Fig. 6A
Fig. 6B

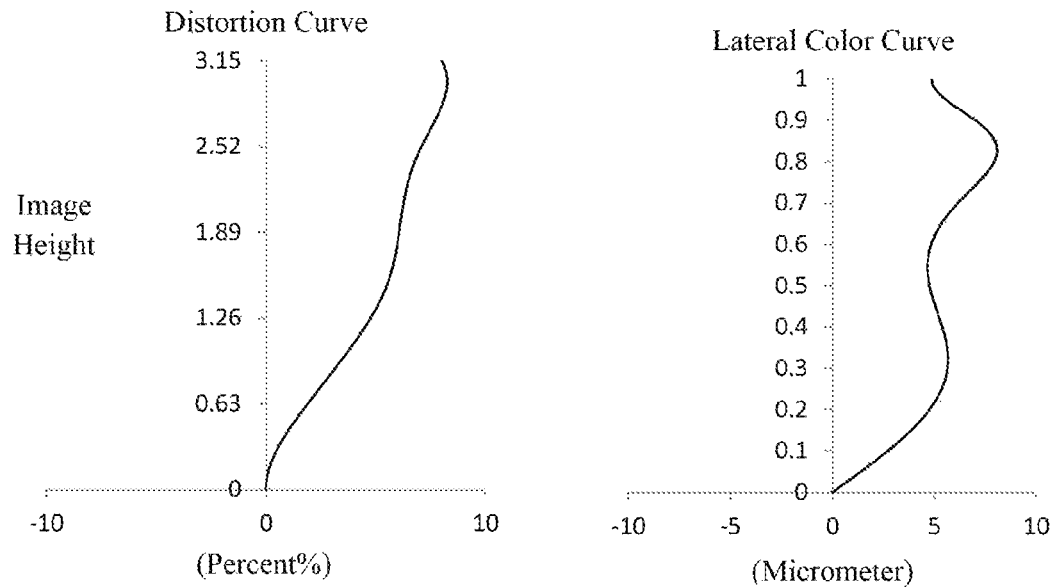
Fig. 6C
Fig. 6D
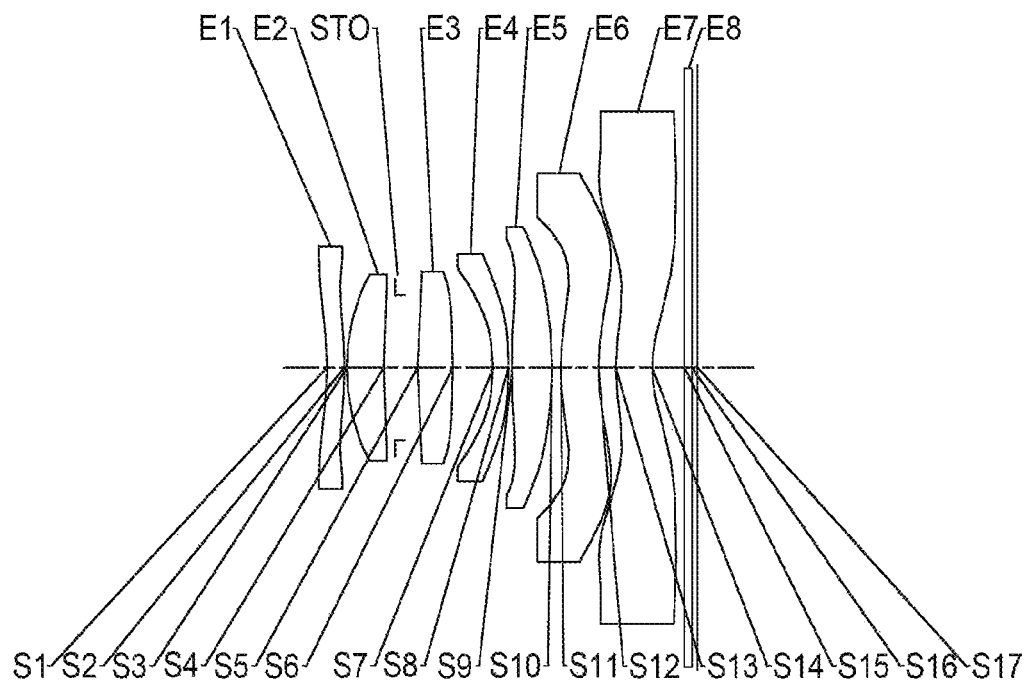
Fig. 7

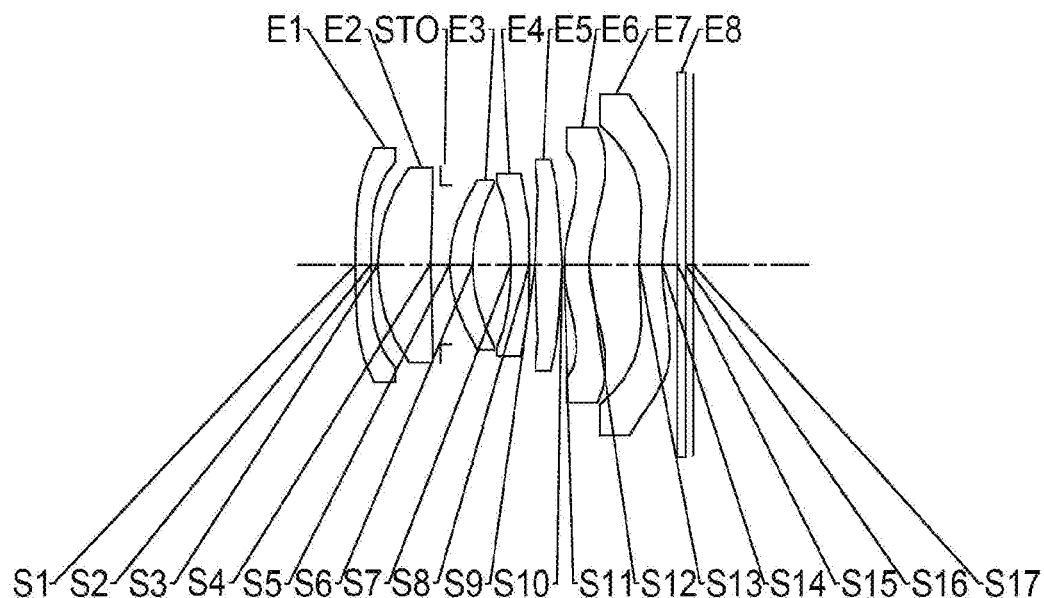
Fig. 9
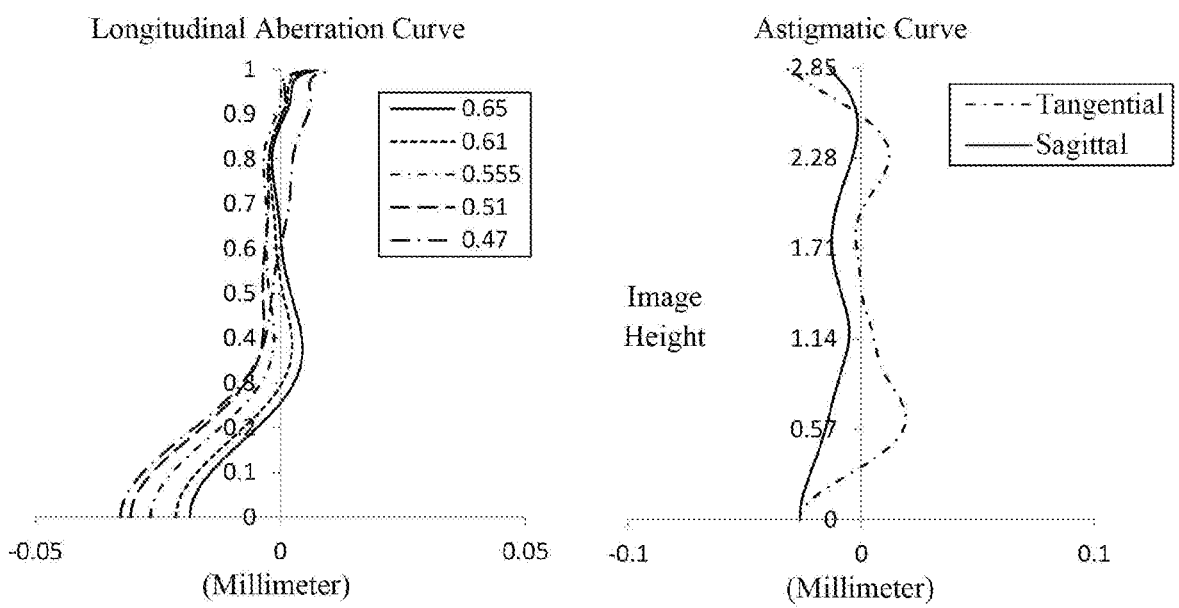
Fig. 10A
Fig. 10B

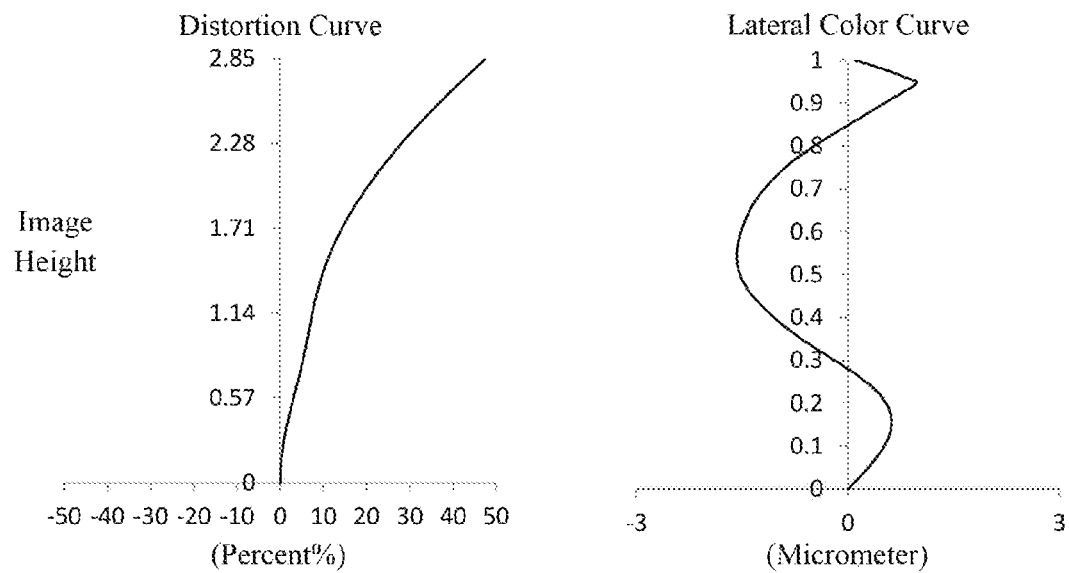
Fig. 10C
Fig. 10D
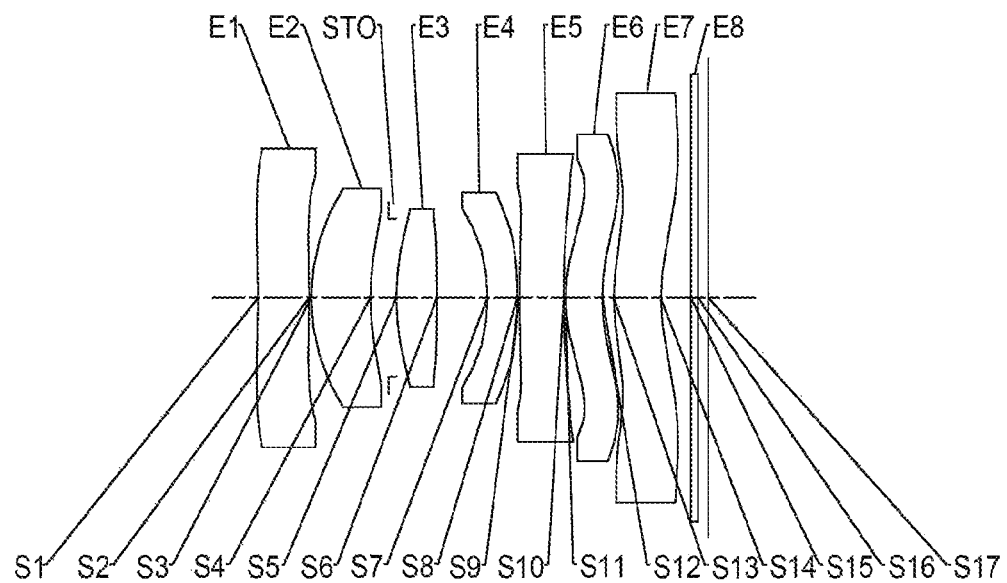
Fig. 11

OPTICAL IMAGING LENS ASSEMBLY INCLUDING SEVEN LENSES OF −++−++−, +++−++−, −−+−++−, −++−+−− OR +++−+++ REFRACTIVE POWERS

CROSS-REFERENCE TO RELATED APPLICATION

This application claims benefit of priority to Chinese Patent Application No. 201910768647.1 filed on Aug. 20, 2019 before the China National Intellectual Property Administration, the entire disclosure of which is incorporated herein by reference in its entity.

TECHNICAL FIELD

The present disclosure relates to the field of optical elements, and specifically to an optical imaging lens assembly.

BACKGROUND

With the advancement of science and technology, electronic products have developed rapidly. Especially electronic products with camera function, such as portable camera devices, are favored by the market. At the same time, with the continuous promotion and application of camera device, the market has become increasingly demanding on its imaging quality. Among them, the performance of the optical imaging lens assembly is a key factor affecting the imaging quality of the camera equipment. Therefore, a high-quality imaging optical imaging lens assembly is needed to meet market demand.

SUMMARY

One aspect of the present disclosure provides an optical imaging lens assembly, which includes, sequentially from an object side to an image side along an optical axis: a first lens, having a refractive power; a second lens, having a refractive power, an object-side surface of the second lens being a convex surface, and an image-side surface of the second lens being a concave surface; a third lens, having a positive refractive power, and an object-side surface of the third lens being a convex surface; a fourth lens, having a negative refractive power, and an object-side surface of the fourth lens being a concave surface; a fifth lens, having a refractive power; a sixth lens, having a refractive power, an object-side surface of the sixth lens being a convex surface, and an image-side surface of the sixth lens being a concave surface, and at least one surface of the object-side surface and the image-side surface of the sixth lens having an inflection point; and a seventh lens, having a refractive power, an object-side surface of the seventh lens being a convex surface, and an image-side surface of the seventh lens being a concave surface, and at least one surface of the object-side surface and the image-side surface of the seventh lens having an inflection point.

In one implementation, a total effective focal length f of the optical imaging lens assembly and a radius of curvature R11 of an object-side surface of the sixth lens satisfy $1.00 < f/R11 < 2.50$.

In one implementation, half of a maximal field-of-view angle Semi-FOV of the optical imaging lens assembly satisfies $0.3 < \tan^2(\text{Semi-FOV}) < 1.2$.

In one implementation, an effective focal length f3 of the third lens and the total effective focal length f of the optical imaging lens assembly satisfy $1.00 < f3/f < 2.50$.

In one implementation, the optical imaging lens assembly further includes a stop. The stop is disposed between the second lens and the third lens.

In one implementation, a radius of curvature R13 of an object-side surface of the seventh lens and a radius of curvature R14 of an image-side surface of the seventh lens satisfy $1.00 < R13/R14 < 2.00$.

In one implementation, an effective focal length f4 of the fourth lens and a radius of curvature R7 of an object-side surface of the fourth lens satisfy $0.50 < f4/R7 < 3.50$.

In one implementation, a spaced interval T67 between the sixth lens and the seventh lens along the optical axis and a spaced interval T34 between the third lens and the fourth lens along the optical axis may satisfy $0.20 < T67/T34 < 1.50$.

In one implementation, a center thickness CT3 of the third lens along the optical axis and half of a diagonal length ImgH of an effective pixel area on the imaging plane of the optical imaging lens assembly satisfy $1.00 < 10*CT3/\text{ImgH} < 2.50$.

In one implementation, a distance SAG41 along the optical axis from an intersection of an object-side surface of the fourth lens and the optical axis to a vertex of an effective radius of the object-side surface of the fourth lens and a distance SAG42 along the optical axis from an intersection of an image-side surface of the fourth lens and the optical axis to a vertex of an effective radius of the image-side surface of the fourth lens satisfy $1.00 < \text{SAG41}/\text{SAG42} < 2.00$.

In one implementation, a maximum effective radius DT11 of an object-side surface of the first lens and a maximum effective radius DT12 of an image-side surface of the first lens satisfy $7.50 < (\text{DT11}+\text{DT12})/(\text{DT11}-\text{DT12}) < 19.50$.

In one implementation, a center thickness CT4 of the fourth lens along the optical axis and a center thickness CT5 of the fifth lens along the optical axis satisfy $2.00 < (\text{CT5}+\text{CT4})/(\text{CT5}-\text{CT4}) < 5.5$.

The present disclosure provides an optical imaging lens assembly which employs plurality of lenses, including a first lens to a seventh lens. By properly disposing the proportional relationship between a total effective focal length of the optical imaging lens assembly and a radius of curvature of an object-side surface of the sixth lens, and optimizing the refractive power, surface shape of each lens, reasonably matching them with each other, and setting the corresponding inflection point on the object-side surface and image-side surface of the corresponding lens, the excessive aberration of the optical imaging lens assembly can be avoid, the tolerance sensitivity of the sixth lens can be reduced effectively, and the imaging quality of the optical imaging lens assembly can be improved.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 5 is a schematic structural view of an optical imaging lens assembly according to embodiment 3 of the present disclosure;

FIGS. 6A-6D illustrate a longitudinal aberration curve, an astigmatic curve, a distortion curve and a lateral color curve of the optical imaging lens assembly according to embodiment 3, respectively;

FIG. 7 is a schematic structural view of an optical imaging lens assembly according to embodiment 4 of the present disclosure;

FIG. 9 is a schematic structural view of an optical imaging lens assembly according to embodiment 5 of the present disclosure;

FIGS. 10A-10D illustrate a longitudinal aberration curve, an astigmatic curve, a distortion curve and a lateral color curve of the optical imaging lens assembly according to embodiment 5, respectively;

FIG. 11 is a schematic structural view of an optical imaging lens assembly according to embodiment 6 of the present disclosure.

DETAILED DESCRIPTION OF EMBODIMENTS

Figure 1:
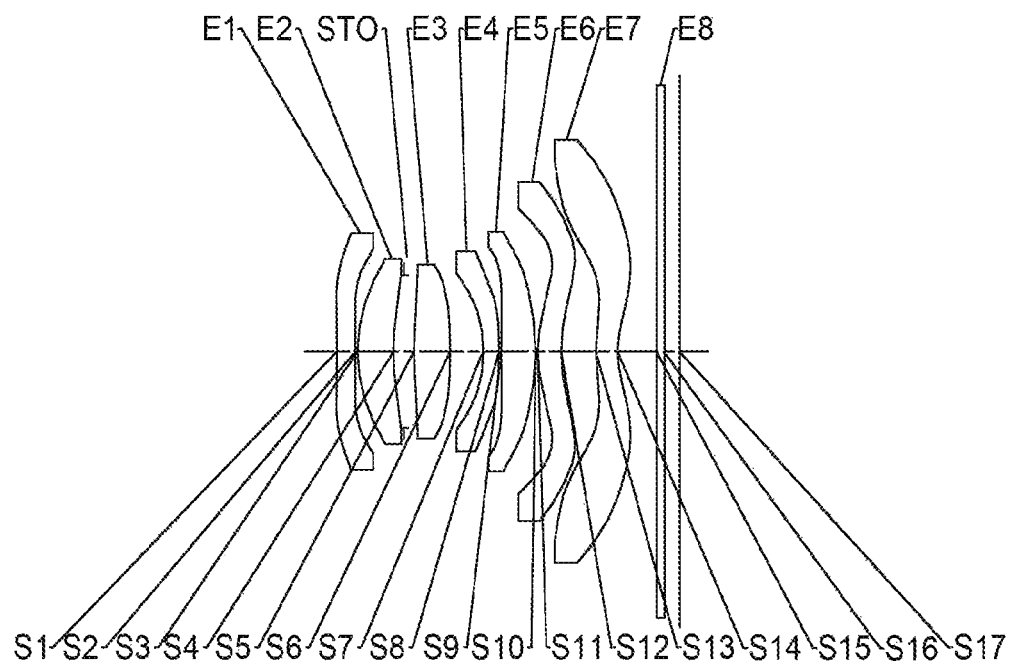
FIG. 1 is a schematic structural view of an optical imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. The surface of each lens closest to the object side is referred to as an object-side surface, and the surface of each lens closest to the image side is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging lens assembly according to an exemplary embodiment of the present disclosure may include seven lenses which having refractive power, that is, a first lens, a second lens, a third lens, a fourth lens, a fifth lens, a sixth lens and a seventh lens. The seven lenses are arranged sequentially from an object side to an image side along an optical axis.

In an exemplary implementation, the first lens may have a positive or negative refractive power; the second lens may have a positive or negative refractive power, an object-side surface thereof is a convex surface, and an image-side surface thereof is a concave surface; the third lens may have a positive refractive power, and an object-side surface thereof is a convex surface; the fourth lens has a negative refractive power, and an object-side surface thereof is a concave surface; the fifth lens may have a positive or negative refractive power; the sixth lens may have a positive or negative refractive power, an object-side surface thereof is a convex surface, and an image-side surface thereof is a concave surface, and at least one of the object-side surface and the image-side surface of the sixth lens has an inflection point; and the seventh lens may have a positive or negative refractive power, an object-side surface thereof is a convex surface, and an image-side surface thereof is a concave surface, and at least one of the object-side surface and the image-side surface of the seventh lens has an inflection point.

A total effective focal length f of the optical imaging lens assembly and a radius of curvature R11 of an object-side surface of the sixth lens satisfy $1.00<f/R11<2.50$, and more specifically, $1.20<f/R11<2.40$.

In the above optical imaging lens assembly, the object-side surface of the second lens is a convex surface, and the image-side surface of the second lens is a concave surface. The surface shape configuration of the second lens is beneficial to reduce the aperture value of the optical imaging lens assembly and at the same time make the lens have a better convergence effect on light.

In order to prevent the refractive power from being excessively concentrated on one lens, when the refractive power is distributed to each lens, the third lens has a positive refractive power and the fourth lens has a negative refractive power, so as to achieve reasonable refractive power distribution.

The object-side surface of the third lens is a convex surface, while the object-side surface of the fourth lens is a concave surface. Such surface shape configuration is beneficial to reduce the aperture value of the optical imaging lens assembly, and at the same time make the edge light of the optical system converge well on the imaging plane, thereby beneficial to increase the imaging area of the optical system.

The sixth lens has a convex object-side surface and a concave image-side surface, and at least one of the object-side surface and the image-side surface of the sixth lens has an inflection point, while the seventh lens has a convex object-side surface and a concave image-side surface, and at least one of the object-side surface and the image-side surface of the seventh lens has an inflection point. Such surface shape configuration is beneficial to improve the spherical aberration of the optical system, so that the optical imaging lens assembly has better aberration correction capability. Setting the inflection point on the surface shape is beneficial to correct coma of the optical system, improve imaging quality, offset the low-order aberration of the optical system, and reduce tolerance sensitivity.

At the same time, by properly disposing the proportional relationship between a total effective focal length of the optical imaging lens assembly and a radius of curvature of an object-side surface of the sixth lens, the excessive aberration of the optical system can be avoid, the tolerance sensitivity of the sixth lens can be reduced effectively, and the manufacturing yield of the subsequent lens can be improved.

In an exemplary implementation, half of a maximal field-of-view angle Semi-FOV of the optical imaging lens assembly satisfy $0.3<\tan^2(\text{Semi-FOV})<1.2$. Reasonably setting the numerical range of the maximum half angle of view of the optical imaging lens is beneficial to increase the aperture of the lens and improve the imaging effect of the optical imaging lens in a dim environment.

In an exemplary implementation, a spaced interval T67 between the sixth lens and the seventh lens along the optical axis and a spaced interval T34 between the third lens and the fourth lens along the optical axis satisfy $0.20<T67/T34<1.50$, and more specifically, $0.22<T67/T34<1.32$. Properly disposing the proportional relationship between a spaced interval between the sixth lens and the seventh lens along the optical axis and a spaced interval between the third lens and the fourth lens along the optical axis is not only beneficial to the miniaturization of the optical imaging lens assembly and reduce the risk of ghost images, but also beneficial to reduce the chromatic aberration of the optical imaging lens assembly.

In an exemplary implementation, an effective focal length f3 of the third lens and the total effective focal length f of the optical imaging lens assembly satisfy $1.00<f3/f<2.50$. By properly disposing the proportional relationship between the effective focal length of the third lens and the total effective focal length of the optical imaging lens is not only beneficial to improve the aberration correction capability of the optical imaging lens assembly and make the third lens cooperate with other lenses to better correct the system aberration, but also beneficial to control the size of the optical imaging lens assembly to meet the requirements of miniaturization.

In an exemplary implementation, a radius of curvature R13 of an object-side surface of the seventh lens and a radius of curvature R14 of an image-side surface of the seventh lens satisfy $1.00<R13/R14<2.00$, and more specifically, $1.00<R13/R14<1.80$. Properly disposing the proportional relationship between the radius of curvature of the object-side surface of the seventh lens and the radius of curvature of the image-side surface of the seventh lens is not only beneficial to improve the aberration correction capability at the edge field of view of the optical imaging lens assembly, but also beneficial to improve the size of the imaging plane of the optical imaging lens assembly, expand the imaging range of the optical system and improve the processing technology of the lens assembly.

In an exemplary implementation, an effective focal length f4 of the fourth lens and a radius of curvature R7 of an object-side surface of the fourth lens satisfy $0.50<f4/R7<3.50$. By controlling the ratio of the effective focal length of the fourth lens to the radius of curvature of the object-side of the fourth lens of the optical imaging lens assembly within a reasonable value range, the optical imaging lens assembly can be miniaturized while having a better process to facilitate mass production in later processing. In addition, such an arrangement is also beneficial to correct the aberrations at the center and edge fields of view of the optical system.

In an exemplary implementation, a center thickness CT3 of the third lens along the optical axis and half of a diagonal length ImgH of an effective pixel area on the imaging plane of the optical imaging lens assembly satisfy $1.00<10*CT3/\text{ImgH}<2.50$. Properly disposing the proportional relationship between a center thickness of the third lens along the optical axis and half of a diagonal length of an effective pixel area on the imaging plane can effectively reduce the risk of ghost images of the optical imaging lens assembly and reduce the lens size of the optical imaging lens assembly.

In an exemplary implementation, a distance SAG41 along the optical axis from an intersection of an object-side surface of the fourth lens and the optical axis to a vertex of an effective radius of the object-side surface of the fourth lens and a distance SAG42 along the optical axis from an intersection of an image-side surface of the fourth lens and the optical axis to a vertex of an effective radius of the image-side surface of the fourth lens satisfy $1.00<\text{SAG41}/\text{SAG42}<2.00$. Setting the ratio of the on-axis distance from the intersection of the object-side surface of the fourth lens and the optical axis to the vertex of the effective radius of the object-side surface of the fourth lens and the on-axis distance from the intersection of the image-side surface of the fourth lens and the optical axis to the vertex of the effective radius of the image-side surface of the fourth lens within a reasonable value range can prevent the fourth lens from being too curved and prevent the increased processing difficulty caused by the fourth lens of being too curved. At the same time, the above relationship disposing in this implementation can also reduce the spherical aberration of the optical system.

In an exemplary implementation, a maximum effective radius DT11 of an object-side surface of the first lens and a maximum effective radius DT12 of an image-side surface of the first lens satisfy 7.50<(DT11+DT12)/(DT11−DT12) <19.50. By controlling the maximum effective radius of the object-side surface of the first lens and the maximum effective radius of the image-side surface of the first lens to satisfy the above relationship, the effective radius of the object-side surface of the first lens and the effective radius of the image-side surface of the first lens can be effectively prevented from differing too much, which is not only beneficial to the processing of the lens, but also beneficial to improve the performance stability of the optical imaging lens assembly.

In an exemplary implementation, a center thickness CT4 of the fourth lens along the optical axis and a center thickness CT5 of the fifth lens along the optical axis satisfy 2.00<(CT5+CT4)/(CT5−CT4)<5.5. By controlling the center thickness of the fourth lens and the center thickness of the fifth lens to satisfy the above relationship, the chromatic aberration of the optical system can be better offset, and the difficulty in processing due to the fifth lens being too thin can be avoided.

In an exemplary implementation, the above optical imaging lens assembly further includes a stop. The stop can be disposed at an appropriate position as needed. For example, the stop is disposed between the second lens and the third lens. Optionally, the above optical imaging lens assembly may further include a optical filter for correcting color deviation and/or a protective glass for protecting the photosensitive element on the imaging plane.

In an exemplary implementation, the object-side surface and the image-side surface of all lenses in the optical imaging lens assembly of the present disclosure are optionally aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality.

In an exemplary implementation, the present disclosure further provides a camera device, and the camera device includes the optical imaging lens assembly described above.

In an exemplary implementation, the present disclosure further provides an electronic device, and the electronic device includes the camera device described above.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of the optical imaging lens assembly according to embodiment 1 of the present disclosure.

As shown in FIG. 1, the optical imaging lens assembly includes, sequentially from an object side to an image side along an optical axis: a first lens E1, a second lens E2, a stop STO, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is a concave surface, and an image-side surface S2 thereof is a convex surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a concave surface, and an image-side surface S8 thereof is a convex surface. The fifth lens E5 has a positive refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 1 is a table showing basic parameters of the optical imaging lens assembly in embodiment 1, wherein the units for the radius of curvature, the thickness and the focal length are millimeter (mm).

TABLE 1

| Surface number | Surface type | Radius of curvature | Thickness/ Distance | Material Refractive index | Material Abbe number | Focal length | Conic coefficient |
|---|---|---|---|---|---|---|---|
| OBJ | spherical | infinite | infinite | | | | |
| S1 | aspheric | −7.2343 | 0.2562 | 1.68 | 19.2 | −79.14 | |
| S2 | aspheric | −8.4822 | 0.0300 | | | | |
| S3 | aspheric | 1.6116 | 0.4968 | 1.55 | 56.1 | 7.49 | |
| S4 | aspheric | 2.3706 | 0.1460 | | | | |
| STO | spherical | infinite | 0.1379 | | | | |
| S5 | aspheric | 3.9282 | 0.5026 | 1.55 | 56.1 | 4.57 | |
| S6 | aspheric | −6.5171 | 0.4586 | | | | |
| S7 | aspheric | −1.7875 | 0.2200 | 1.68 | 19.2 | −4.59 | |

TABLE 1-continued

| Surface number | Surface type | Radius of curvature | Thickness/ Distance | Material Refractive index | Abbe number | Focal length | Conic coefficient |
|---|---|---|---|---|---|---|---|
| S8 | aspheric | −4.4126 | 0.0300 | | | | |
| S9 | aspheric | −7.4678 | 0.4769 | 1.55 | 56.1 | 5.72 | |
| S10 | aspheric | −2.2511 | 0.0300 | | | | |
| S11 | aspheric | 1.5600 | 0.3228 | 1.67 | 20.4 | 8.99 | −1.0000 |
| S12 | aspheric | 1.9346 | 0.4813 | | | | −1.0000 |
| S13 | aspheric | 1.7772 | 0.3021 | 1.54 | 55.9 | −5.43 | −1.0000 |
| S14 | aspheric | 1.0382 | 0.5390 | | | | −1.0000 |
| S15 | spherical | infinite | 0.1100 | 1.52 | 64.2 | | |
| S16 | spherical | infinite | 0.2097 | | | | |
| S17 | spherical | infinite | | | | | |

In the present embodiment, a total effective focal length of the optical imaging lens assembly satisfies f=3.13 mm, a distance along the optical axis from the object-side surface S1 of the first lens E1 to the imaging plane S17 satisfies TTL=4.75 mm, half of a diagonal length of an effective pixel area on the imaging plane S17 satisfies ImgH=3.35 mm, half of a maximal field-of-view angle of the optical imaging lens assembly satisfies Semi-FOV=45.6°, and a F number of the optical imaging lens assembly satisfies Fno=1.52.

In the embodiment 1, the object-side surface and the image-side surface of any one of the first lens E1 to the seventh lens E7 are aspheric, and the surface shape x of each aspheric lens can be defined by using, but not limited to, the following aspheric formula:

$$x = \frac{ch^2}{1+\sqrt{1-(k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature in the above Table 1); k is the conic coefficient; and $A_i$ is a correction coefficient for the i-th order of the aspheric surface. Table 2 below shows high-order coefficients $A_4, A_6, A_8, A_{10}, A_{12}, A_{14}, A_{16}, A_{18}$ and $A_{20}$ applicable to each aspheric surface S1-S14 in embodiment 1.

TABLE 2

| Surface number | A4 | A6 | A8 | A10 | A12 |
|---|---|---|---|---|---|
| S1 | 1.3784E−01 | −1.1807E−01 | 2.4839E−01 | −3.8090E−01 | 3.9768E−01 |
| S2 | 1.4536E−01 | −1.1120E−01 | 6.4216E−01 | −1.8928E+00 | 3.4060E+00 |
| S3 | −9.2298E−02 | 1.5528E−01 | −1.8555E−01 | −1.1523E−01 | 8.3733E−01 |
| S4 | −1.4394E−01 | 9.0477E−02 | −3.7960E−01 | 1.4030E+00 | −3.0727E+00 |
| S5 | −5.6335E−02 | 4.6881E−02 | −4.2785E−01 | 1.3777E+00 | −2.9415E+00 |
| S6 | −3.2042E−02 | −3.2168E−01 | 1.4890E+00 | −4.9071E+00 | 1.0035E+01 |
| S7 | −2.7205E−01 | 3.3818E−01 | −1.0747E+00 | 3.7775E+00 | −8.4799E+00 |
| S8 | 1.2399E−01 | −1.5034E+00 | 3.7075E+00 | −5.7197E+00 | 6.3546E+00 |
| S9 | 6.0021E−01 | −1.9720E+00 | 3.8487E+00 | −5.3678E+00 | 5.3791E+00 |
| S10 | 8.8369E−02 | 1.8544E−02 | 2.7867E−02 | −4.6175E−01 | 8.1046E−01 |
| S11 | −4.2637E−02 | −1.6940E−01 | 1.1849E−01 | 6.9258E−03 | −8.0635E−02 |
| S12 | 5.0470E−02 | −3.0924E−01 | 3.2696E−01 | −2.1651E−01 | 9.0293E−02 |
| S13 | −4.7049E−01 | 2.1142E−01 | −8.9232E−02 | 4.9128E−02 | −1.9805E−02 |
| S14 | −5.3315E−01 | 3.8414E−01 | −2.2965E−01 | 9.9818E−02 | −2.8897E−02 |

| Surface number | A14 | A16 | A18 | A20 |
|---|---|---|---|---|
| S1 | −2.7608E−01 | 1.2100E−01 | −3.0235E−02 | 3.2503E−03 |
| S2 | −3.7852E+00 | 2.5359E+00 | −9.3525E−01 | 1.4453E−01 |
| S3 | −1.4182E+00 | 1.2163E+00 | −5.3924E−01 | 9.7983E−02 |
| S4 | 3.8010E+00 | −2.4600E+00 | 6.5429E−01 | 0.0000E+00 |
| S5 | 3.9886E+00 | −3.2550E+00 | 1.4495E+00 | −2.6198E−01 |
| S6 | −1.2895E+01 | 1.0184E+01 | −4.5278E+00 | 8.7075E−01 |
| S7 | 1.2151E+01 | −1.0564E+01 | 4.9931E+00 | −9.7754E−01 |
| S8 | −4.9347E+00 | 2.5067E+00 | −7.5306E−01 | 1.0306E−01 |
| S9 | −3.7964E+00 | 1.7828E+00 | −4.9741E−01 | 6.1997E−02 |
| S10 | −6.8521E−01 | 3.1963E−01 | −7.8466E−02 | 7.8947E−03 |
| S11 | 6.1251E−02 | −2.1452E−02 | 3.7257E−03 | −2.5932E−04 |
| S12 | −2.2974E−02 | 3.4235E−03 | −2.7195E−04 | 8.7866E−06 |
| S13 | 4.7809E−03 | −6.7142E−04 | 5.1119E−05 | −1.6399E−06 |
| S14 | 5.3362E−03 | −6.0084E−04 | 3.7510E−05 | −9.9405E−07 |

Figures 2A, 2B:
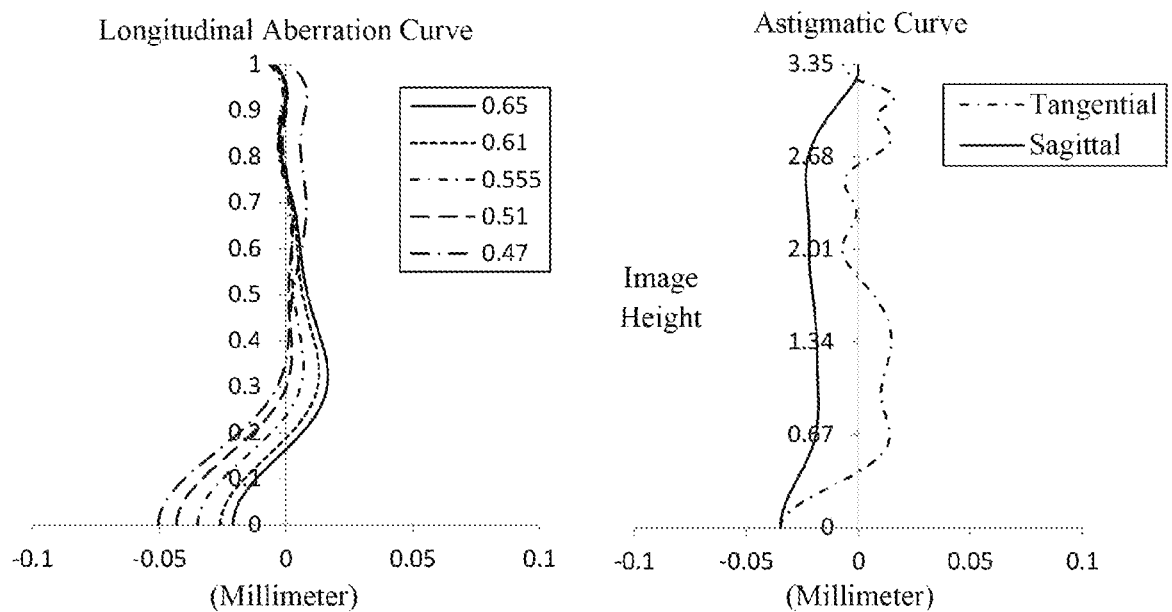
FIGS. 2A-2D illustrate a longitudinal aberration curve, an astigmatic curve, a distortion curve and a lateral color curve of the optical imaging lens assembly according to embodiment 1, respectively.
Figures 2C, 2D:
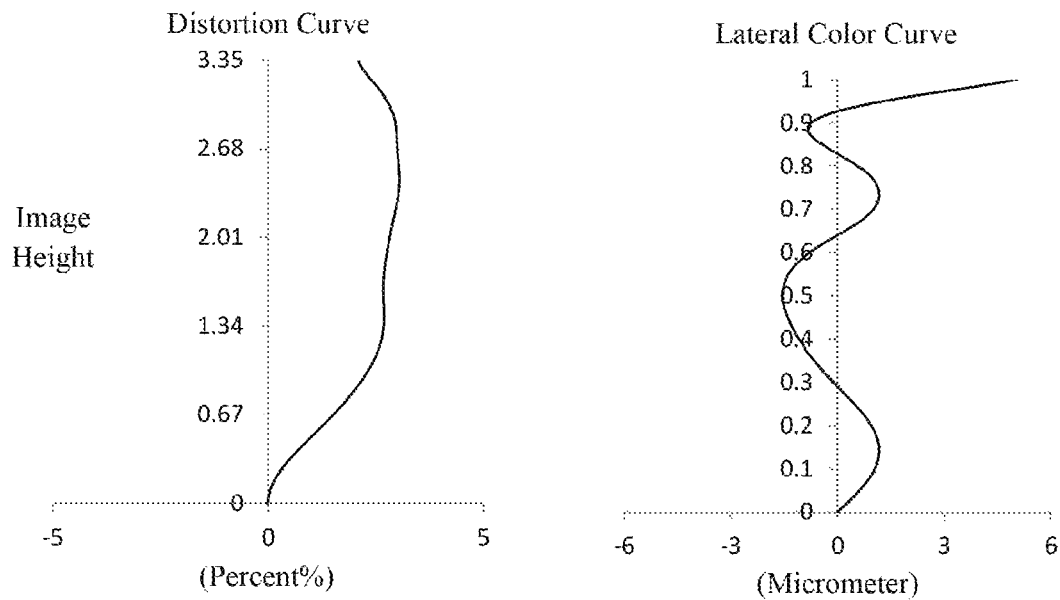

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatic curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion at different image heights. FIG. 2D illustrates a lateral color curve of the optical imaging lens assembly according to embodiment 1, representing deviations of different image heights on an imaging plane after light passes through the optical imaging lens assembly. It can be seen from FIG. 2A to FIG. 2D that the optical imaging lens assembly provided in embodiment 1 can achieve a good imaging quality Embodiment 2

Figure 3:
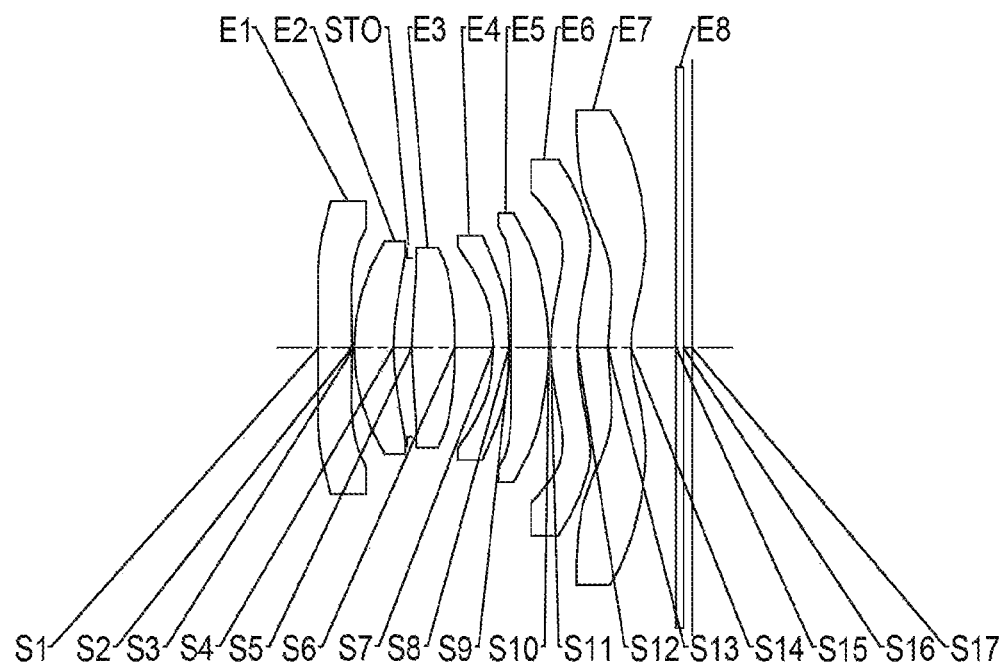
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. FIG. 3 is a schematic structural view of the optical imaging lens assembly according to embodiment 2 of the present disclosure.

As shown in FIG. 3, the optical imaging lens assembly includes, sequentially from an object side to an image side along an optical axis: a first lens E1, a second lens E2, a stop STO, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a concave surface, and an image-side surface S2 thereof is a convex surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a concave surface, and an image-side surface S8 thereof is a convex surface. The fifth lens E5 has a positive refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

In the present embodiment, a total effective focal length of the optical imaging lens assembly satisfies f=3.42 mm, a distance along the optical axis from the object-side surface S1 of the first lens E1 to the imaging plane S17 satisfies TTL=5.50 mm, half of a diagonal length of an effective pixel area on the imaging plane S17 satisfies ImgH=3.43 mm, half of a maximal field-of-view angle of the optical imaging lens assembly satisfies Semi-FOV=43.8°, and a F number of the optical imaging lens assembly satisfies Fno=1.52.

Table 3 is a table showing basic parameters of the optical imaging lens assembly in embodiment 2, wherein the units for the radius of curvature, the thickness and the focal length are millimeter (mm).

TABLE 3

| Surface number | Surface type | Radius of curvature | Thickness/ Distance | Refractive index | Abbe number | Focal length | Conic coefficient |
|---|---|---|---|---|---|---|---|
| OBJ | spherical | infinite | infinite | | | | |
| S1 | aspheric | −13.0673 | 0.4917 | 1.68 | 19.2 | 499.95 | |
| S2 | aspheric | −12.7732 | 0.0300 | | | | |
| S3 | aspheric | 1.8369 | 0.5841 | 1.55 | 56.1 | 11.07 | |
| S4 | aspheric | 2.3431 | 0.1983 | | | | |
| STO | spherical | infinite | 0.0717 | | | | |
| S5 | aspheric | 4.4575 | 0.6325 | 1.55 | 56.1 | 4.70 | |
| S6 | aspheric | −5.7431 | 0.5688 | | | | |
| S7 | aspheric | −2.0254 | 0.2268 | 1.68 | 19.2 | −6.25 | |
| S8 | aspheric | −4.0576 | 0.0312 | | | | |
| S9 | aspheric | −9.0505 | 0.5556 | 1.55 | 56.1 | 6.20 | |
| S10 | aspheric | −2.5174 | 0.0300 | | | | |
| S11 | aspheric | 1.9835 | 0.3887 | 1.67 | 20.4 | 13.22 | −1.0000 |
| S12 | aspheric | 2.3591 | 0.4513 | | | | −1.0000 |
| S13 | aspheric | 2.1174 | 0.3385 | 1.54 | 55.9 | −5.96 | −1.0000 |
| S14 | aspheric | 1.2033 | 0.6668 | | | | −1.0000 |
| S15 | spherical | infinite | 0.1100 | 1.52 | 64.2 | | |
| S16 | spherical | infinite | 0.1242 | | | | |
| S17 | spherical | infinite | | | | | |

In the embodiment 2, the object-side surface and the image-side surface of any one of the first lens E1 to the seventh lens E7 are aspheric. Table 4 below shows high-order coefficients $A_4, A_6, A_8, A_{10}, A_{12}, A_{14}, A_{16}, A_{18}$ and $A_{20}$ applicable to each aspheric surface S1-S14 in embodiment 2.

TABLE 4

| Surface number | A4 | A6 | A8 | A10 | A12 |
|---|---|---|---|---|---|
| S1  | 4.9437E−02  | −2.5361E−02 | 3.1953E−02  | −2.9345E−02 | 1.8348E−02  |
| S2  | 6.6257E−02  | −3.4222E−02 | 1.3342E−01  | −2.6552E−01 | 3.2257E−01  |
| S3  | −5.0014E−02 | 6.1939E−02  | −5.4481E−02 | −2.4906E−02 | 1.3322E−01  |
| S4  | −9.4986E−02 | 4.8499E−02  | −1.6529E−01 | 4.9625E−01  | −8.8289E−01 |
| S5  | −3.5389E−02 | 2.3351E−02  | −1.6891E−01 | 4.3114E−01  | −7.2974E−01 |
| S6  | −1.7734E−02 | −1.3248E−01 | 4.5627E−01  | −1.1188E+00 | 1.7023E+00  |
| S7  | −1.6814E−01 | 1.6431E−01  | −4.1049E−01 | 1.1343E+00  | −2.0018E+00 |
| S8  | 7.7506E−02  | −7.4298E−01 | 1.4486E+00  | −1.7669E+00 | 1.5520E+00  |
| S9  | 3.5609E−01  | −9.0127E−01 | 1.3553E+00  | −1.4567E+00 | 1.1250E+00  |
| S10 | 5.4781E−02  | 7.0649E−03  | 1.6668E−01  | −1.4803E−01 | 1.9977E−01  |
| S11 | −2.9397E−02 | −9.6570E−02 | 5.5652E−02  | 3.3622E−03  | −2.6770E−02 |
| S12 | 3.3591E−02  | −1.6791E−01 | 1.4483E−01  | −7.8246E−02 | 2.6621E−02  |
| S13 | −2.8874E−01 | 1.0164E−01  | −3.3607E−02 | 1.4495E−02  | −4.5774E−03 |
| S14 | −3.4264E−01 | 1.9791E−01  | −9.4849E−02 | 3.3050E−02  | −7.6700E−03 |

| Surface number | A14 | A16 | A18 | A20 |
|---|---|---|---|---|
| S1  | −7.6283E−03 | 2.0022E−03  | −2.9963E−04 | 1.9291E−05  |
| S2  | −2.4203E−01 | 1.0947E−01  | −2.7258E−02 | 2.8440E−03  |
| S3  | −1.6610E−01 | 1.0487E−01  | −3.4223E−02 | 4.5775E−03  |
| S4  | 8.8719E−01  | −4.6643E−01 | 1.0077E−01  | 0.0000E+00  |
| S5  | 7.8440E−01  | −5.0745E−01 | 1.7914E−01  | −2.5671E−02 |
| S6  | −1.6274E+00 | 9.5628E−01  | −3.1633E−01 | 4.5261E−02  |
| S7  | 2.2551E+00  | −1.5412E+00 | 5.7268E−01  | −8.8143E−02 |
| S8  | −9.5291E−01 | 3.8270E−01  | −9.0899E−02 | 9.8355E−03  |
| S9  | −6.1190E−01 | 2.2141E−01  | −4.7592E−02 | 4.5690E−03  |
| S10 | −1.3174E−01 | 4.8099E−02  | −9.2557E−03 | 7.3063E−04  |
| S11 | 1.6779E−02  | −4.8682E−03 | 7.0112E−04  | −4.0485E−05 |
| S12 | −5.5260E−03 | 6.7178E−04  | −4.3535E−05 | 1.1475E−06  |
| S13 | 8.6564E−04  | −9.5235E−05 | 5.6802E−06  | −1.4275E−07 |
| S14 | 1.1355E−03  | −1.0249E−04 | 5.1295E−06  | −1.0898E−07 |

Figure 4A:
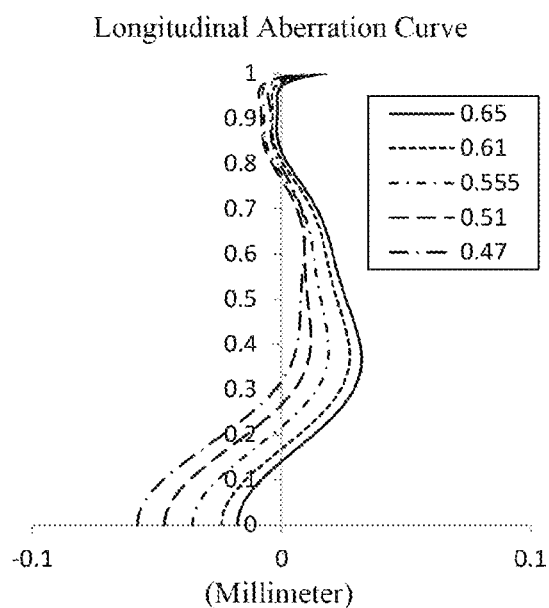
FIGS. 4A-4D illustrate a longitudinal aberration curve, an astigmatic curve, a distortion curve and a lateral color curve of the optical imaging lens assembly according to embodiment 2, respectively.
Figure 4B:
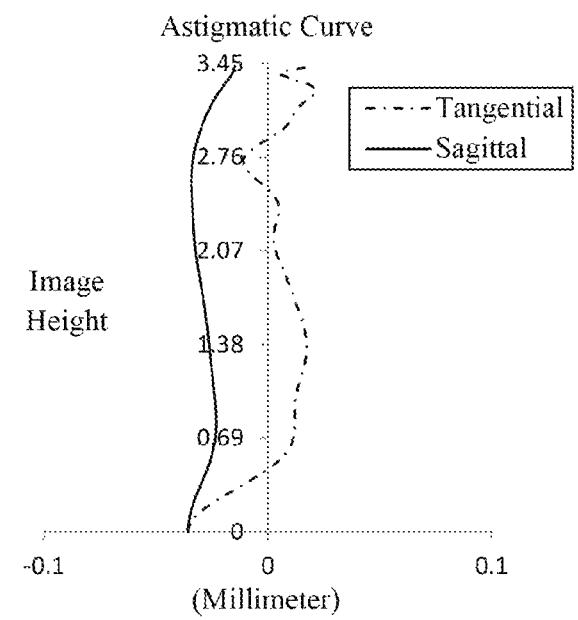
Figure 4C:
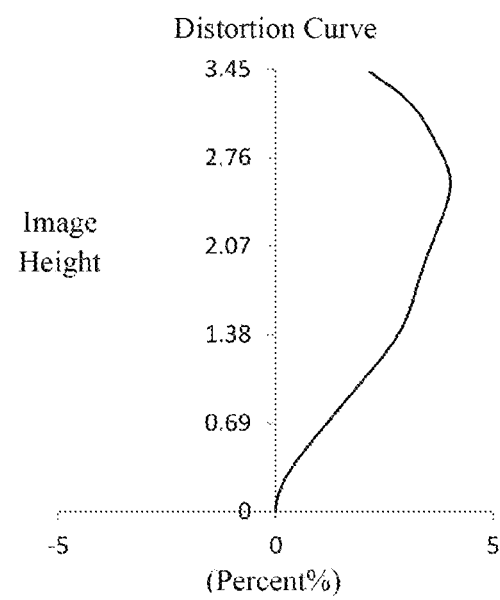
Figure 4D:
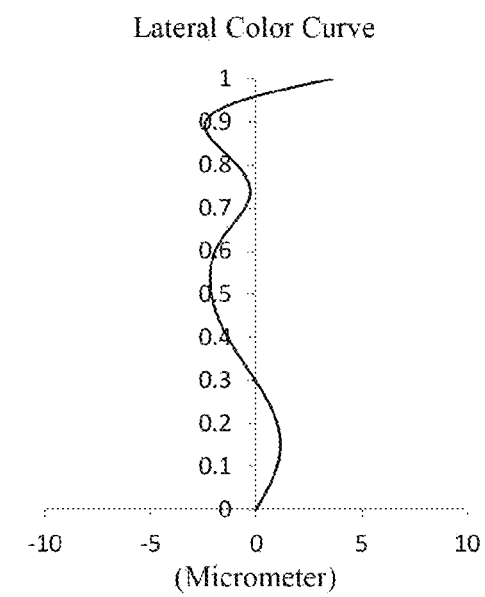

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatic curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion at different image heights. FIG. 4D illustrates a lateral color curve of the optical imaging lens assembly according to embodiment 2, representing deviations of different image heights on an imaging plane after light passes through the optical imaging lens assembly. It can be seen from FIG. 4A to FIG. 4D that the optical imaging lens assembly provided in embodiment 2 can achieve a good imaging quality Embodiment 3

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly includes, sequentially from an object side to an image side along an optical axis: a first lens E1, a second lens E2, a stop STO, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is a concave surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

In the present embodiment, a total effective focal length of the optical imaging lens assembly satisfies f=2.88 mm, a distance along the optical axis from the object-side surface S1 of the first lens E1 to the imaging plane S17 satisfies TTL=5.47 mm, half of a diagonal length of an effective pixel area on the imaging plane S17 satisfies ImgH=3.15 mm, half of a maximal field-of-view angle of the optical imaging lens assembly satisfies Semi-FOV=44.6°, and a F number of the optical imaging lens assembly satisfies Fno=1.82.

Table 5 is a table showing basic parameters of the optical imaging lens assembly in embodiment 3, wherein the units for the radius of curvature, the thickness and the focal length are millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| S1 | aspheric | −446.4209 | 0.5000 | 1.68 | 19.2 | −92.99 | |
| S2 | aspheric | 73.3978 | 0.2116 | | | | |
| S3 | aspheric | 1.9914 | 0.3838 | 1.55 | 56.1 | −338.64 | |
| S4 | aspheric | 1.8361 | 0.1596 | | | | |
| STO | spherical | infinite | 0.0324 | | | | |
| S5 | aspheric | 2.8278 | 0.7148 | 1.55 | 56.1 | 3.48 | |
| S6 | aspheric | −5.2613 | 0.3311 | | | | |
| S7 | aspheric | −2.8320 | 0.3467 | 1.68 | 19.2 | −6.80 | |
| S8 | aspheric | −7.7167 | 0.0833 | | | | |
| S9 | aspheric | 5.8310 | 0.5348 | 1.55 | 56.1 | 5.81 | |
| S10 | aspheric | −6.7306 | 0.1552 | | | | |
| S11 | aspheric | 1.6041 | 0.3102 | 1.67 | 20.4 | 7.96 | −1.0000 |
| S12 | aspheric | 2.1212 | 0.3502 | | | | −1.0000 |
| S13 | aspheric | 2.1354 | 0.3927 | 1.54 | 55.9 | −8.80 | −1.0000 |
| S14 | aspheric | 1.3762 | 0.7596 | | | | −1.0000 |
| S15 | spherical | infinite | 0.1100 | 1.52 | 64.2 | | |
| S16 | spherical | infinite | 0.0964 | | | | |
| S17 | spherical | infinite | | | | | |

In the embodiment 3, the object-side surface and the image-side surface of any one of the first lens E1 to the seventh lens E7 are aspheric. Table 6 below shows high-order coefficients $A_4, A_6, A_8, A_{10}, A_{12}, A_{14}, A_{16}, A_{18}$ and $A_{20}$ applicable to each aspheric surface S1-S14 in embodiment 3.

TABLE 6

| Surface number | A4 | A6 | A8 | A10 | A12 |
|---|---|---|---|---|---|
| S1 | 6.3061E−02 | −3.6537E−02 | 5.1991E−02 | −5.3927E−02 | 3.8082E−02 |
| S2 | 9.9351E−02 | −6.2836E−02 | 2.9999E−01 | −7.3105E−01 | 1.0875E+00 |
| S3 | −5.2332E−02 | 6.6296E−02 | −5.9650E−02 | −2.7894E−02 | 1.5263E−01 |
| S4 | −1.4219E−01 | 8.8831E−02 | −3.7042E−01 | 1.3607E+00 | −2.9619E+00 |
| S5 | −4.5499E−02 | 3.4041E−02 | −2.7919E−01 | 8.0807E−01 | −1.5508E+00 |
| S6 | −2.3611E−02 | −2.0352E−01 | 8.0875E−01 | −2.2881E+00 | 4.0171E+00 |
| S7 | −1.4901E−01 | 1.3709E−01 | −3.2242E−01 | 8.3877E−01 | −1.3935E+00 |
| S8 | 6.9620E−02 | −6.3253E−01 | 1.1689E+00 | −1.3512E+00 | 1.1249E+00 |
| S9 | 2.5332E−01 | −5.4079E−01 | 6.8591E−01 | −6.2180E−01 | 4.0505E−01 |
| S10 | 4.3276E−02 | 4.9606E−03 | 1.0402E−02 | −8.2108E−02 | 9.8489E−02 |
| S11 | −3.3656E−02 | −1.1830E−01 | 7.2943E−02 | 4.7151E−03 | −4.0169E−02 |
| S12 | 3.7524E−02 | −1.9825E−01 | 1.8073E−01 | −1.0320E−01 | 3.7108E−02 |
| S13 | −2.5249E−01 | 8.3115E−02 | −2.5698E−02 | 1.0365E−02 | −3.0607E−03 |
| S14 | −2.2204E−01 | 1.0324E−01 | −3.9830E−02 | 1.1172E−02 | −2.0872E−03 |

| Surface number | A14 | A16 | A18 | A20 |
|---|---|---|---|---|
| S1 | −1.7882E−02 | 5.3010E−03 | −8.9595E−04 | 6.5149E−05 |
| S2 | −9.9920E−01 | 5.5344E−01 | −1.6875E−01 | 2.1559E−02 |
| S3 | −1.9465E−01 | 1.2571E−01 | −4.1965E−02 | 5.7417E−03 |
| S4 | 3.6416E+00 | −2.3425E+00 | 6.1923E−01 | 0.0000E+00 |
| S5 | 1.8901E+00 | −1.3865E+00 | 5.5499E−01 | −9.0179E−02 |
| S6 | −4.4314E+00 | 3.0044E+00 | −1.1468E+00 | 1.8932E−01 |
| S7 | 1.4778E+00 | −9.5082E−01 | 3.3262E−01 | −4.8194E−02 |
| S8 | −6.5458E−01 | 2.4916E−01 | −5.6088E−02 | 5.7519E−03 |
| S9 | −1.8582E−01 | 5.6710E−02 | −1.0281E−02 | 8.3253E−04 |
| S10 | −5.7728E−02 | 1.8733E−02 | −3.2040E−03 | 2.2480E−04 |
| S11 | 2.6939E−02 | −8.3631E−03 | 1.2887E−03 | −7.9623E−05 |
| S12 | −8.1414E−03 | 1.0461E−03 | −7.1650E−05 | 1.9961E−06 |
| S13 | 5.4127E−04 | −5.5685E−05 | 3.1058E−06 | −7.2991E−08 |
| S14 | 2.4874E−04 | −1.8074E−05 | 7.2817E−07 | −1.2453E−08 |

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatic curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion at different image heights. FIG. 6D illustrates a lateral color curve of the optical imaging lens assembly according to embodiment 3, representing deviations of different image heights on an imaging plane after light passes through the optical imaging lens assembly. It can be seen from FIG. 6A to FIG. 6D that the optical imaging lens assembly provided in embodiment 3 can achieve a good imaging quality.

Embodiment 4

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly includes, sequentially from an object side to an image side along an optical axis: a first lens E1, a second lens E2, a stop STO, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is a concave surface, and an image-side surface S2 thereof is a convex surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

In the present embodiment, a total effective focal length of the optical imaging lens assembly satisfies f=3.35 mm, a distance along the optical axis from the object-side surface S1 of the first lens E1 to the imaging plane S17 satisfies TTL=5.28 mm, half of a diagonal length of an effective pixel area on the imaging plane S17 satisfies ImgH=3.28 mm, half of a maximal field-of-view angle of the optical imaging lens assembly satisfies Semi-FOV=41.7°, and a F number of the optical imaging lens assembly satisfies Fno=1.84.

Table 7 is a table showing basic parameters of the optical imaging lens assembly in embodiment 4, wherein the units for the radius of curvature, the thickness and the focal length are millimeter (mm).

TABLE 7

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| S1 | aspheric | −3.2075 | 0.2502 | 1.68 | 19.2 | −42.59 | |
| S2 | aspheric | −3.7223 | 0.0300 | | | | |
| S3 | aspheric | 1.9952 | 0.5290 | 1.55 | 56.1 | 5.35 | |
| S4 | aspheric | 5.6948 | 0.1639 | | | | |
| STO | spherical | infinite | 0.3160 | | | | |
| S5 | aspheric | 4.5650 | 0.5032 | 1.55 | 56.1 | 6.93 | |
| S6 | aspheric | −21.1782 | 0.5759 | | | | |
| S7 | aspheric | −1.7477 | 0.2200 | 1.68 | 19.2 | −5.60 | |
| S8 | aspheric | −3.4036 | 0.0514 | | | | |
| S9 | aspheric | 48.4687 | 0.5716 | 1.55 | 56.1 | 5.67 | |
| S10 | aspheric | −3.2926 | 0.1224 | | | | |
| S11 | aspheric | 2.6808 | 0.5361 | 1.67 | 20.4 | −416.85 | −1.0000 |
| S12 | aspheric | 2.4429 | 0.2464 | | | | −1.0000 |
| S13 | aspheric | 2.0391 | 0.5208 | 1.54 | 55.9 | −8.45 | −1.0000 |
| S14 | aspheric | 1.2814 | 0.4576 | | | | −1.0000 |
| S15 | spherical | infinite | 0.1100 | 1.52 | 64.2 | | |
| S16 | spherical | infinite | 0.0781 | | | | |
| S17 | spherical | infinite | | | | | |

In the embodiment 4, the object-side surface and the image-side surface of any one of the first lens E1 to the seventh lens E7 are aspheric. Table 8 below shows high-order coefficients $A_4, A_6, A_8, A_{10}, A_{12}, A_{14}, A_{16}, A_{18}$ and $A_{20}$ applicable to each aspheric surface S1-S14 in embodiment 4.

TABLE 8

| Surface number | A4 | A6 | A8 | A10 | A12 |
|---|---|---|---|---|---|
| S1 | 7.8655E−02 | −3.1978E−02 | 3.2307E−02 | −2.9629E−02 | 1.9703E−02 |
| S2 | 7.6453E−02 | 7.2146E−03 | −3.9151E−02 | 6.5769E−02 | −6.2281E−02 |
| S3 | −4.2985E−02 | 9.1848E−02 | −1.9043E−01 | 2.5421E−01 | −1.9127E−01 |
| S4 | −6.8039E−02 | 5.4501E−02 | −1.2905E−01 | 2.6277E−01 | −3.3602E−01 |
| S5 | −3.7644E−02 | 1.4703E−02 | −1.0322E−01 | 2.1992E−01 | −2.9227E−01 |
| S6 | −2.5605E−02 | −9.3509E−02 | 2.8617E−01 | −6.6053E−01 | 9.3727E−01 |
| S7 | −7.8534E−02 | 8.7755E−02 | −3.1774E−01 | 8.5101E−01 | −1.3318E+00 |
| S8 | 9.8581E−02 | −5.4173E−01 | 8.3886E−01 | −7.9043E−01 | 5.4917E−01 |
| S9 | 2.7502E−01 | −6.3027E−01 | 8.0802E−01 | −7.3089E−01 | 4.7264E−01 |
| S10 | 5.9026E−02 | 2.8549E−02 | −1.0943E−01 | 7.1323E−02 | −7.3663E−03 |
| S11 | −4.8246E−02 | −3.9084E−02 | 2.3668E−02 | −1.6389E−02 | 8.9740E−03 |
| S12 | −4.6214E−02 | −6.0988E−03 | −9.0598E−03 | 1.0480E−02 | −5.0206E−03 |
| S13 | −2.1746E−01 | 6.6678E−02 | −1.5195E−02 | 3.7755E−03 | −7.9443E−04 |
| S14 | −2.3408E−01 | 1.0925E−01 | −4.1582E−02 | 1.1453E−02 | −2.0953E−03 |

| Surface number | A14 | A16 | A18 | A20 |
|---|---|---|---|---|
| S1 | −9.2927E−03 | 2.8963E−03 | −5.3486E−04 | 4.4569E−05 |
| S2 | 3.4784E−02 | −1.1015E−02 | 1.6680E−03 | −7.4350E−05 |
| S3 | 5.2514E−02 | 2.8047E−02 | −2.7269E−02 | 8.4892E−03 |
| S4 | 2.5363E−01 | −1.0294E−01 | 1.7416E−02 | 0.0000E+00 |
| S5 | 2.3645E−01 | −1.0855E−01 | 2.3952E−02 | −1.3746E−03 |
| S6 | −8.2182E−01 | 4.3724E−01 | −1.2995E−01 | 1.6614E−02 |
| S7 | 1.3832E+00 | −9.1448E−01 | 3.3757E−01 | −5.2123E−02 |
| S8 | −2.7554E−01 | 8.9779E−02 | −1.6751E−02 | 1.4199E−03 |
| S9 | −2.1394E−01 | 6.4297E−02 | −1.1558E−02 | 9.4170E−04 |
| S10 | −1.2874E−02 | 7.1412E−03 | −1.5439E−03 | 1.2461E−04 |
| S11 | −3.0535E−03 | 6.0771E−04 | −6.3507E−05 | 2.6473E−06 |
| S12 | 1.3731E−03 | −2.1651E−04 | 1.8150E−05 | −6.2425E−07 |
| S13 | 1.0971E−04 | −9.0928E−06 | 4.1253E−07 | −7.9019E−09 |
| S14 | 2.4401E−04 | −1.7291E−05 | 6.7817E−07 | −1.1280E−08 |

Figure 8A:
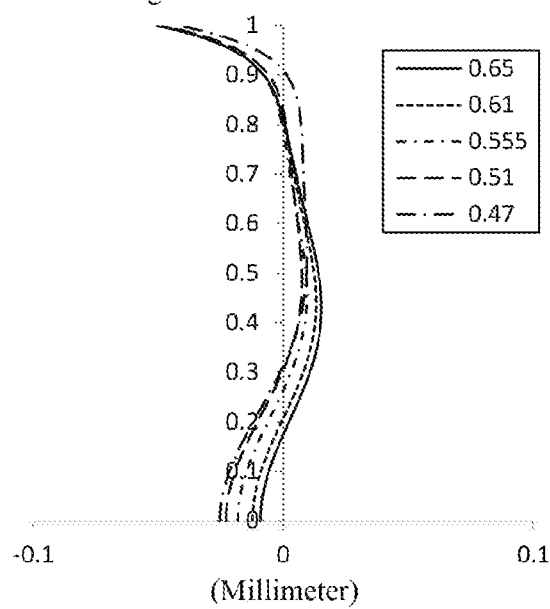
FIGS. 8A-8D illustrate a longitudinal aberration curve, an astigmatic curve, a distortion curve and a lateral color curve of the optical imaging lens assembly according to embodiment 4, respectively.
Figure 8B:
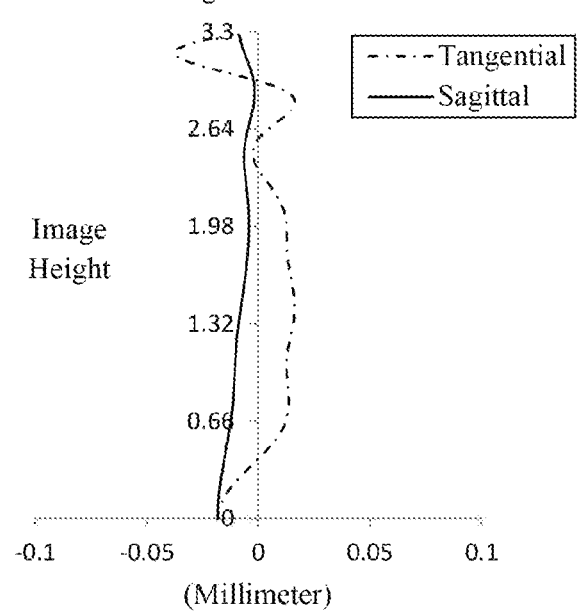
Figure 8C:
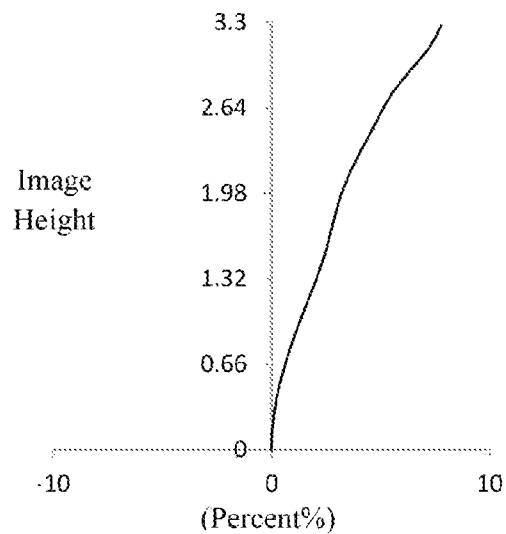
Figure 8D:
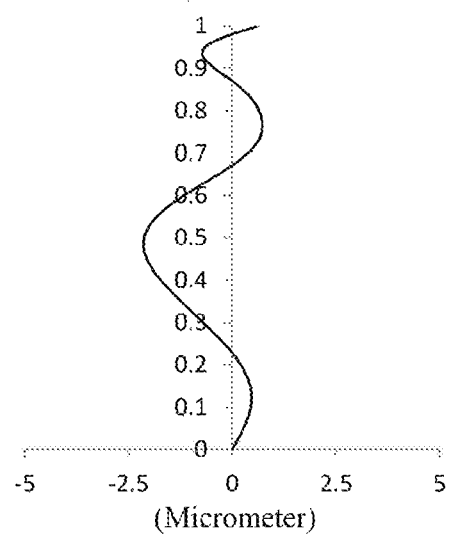

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatic curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion at different image heights. FIG. 8D illustrates a lateral color curve of the optical imaging lens assembly according to embodiment 4, representing deviations of different image heights on an imaging plane after light passes through the optical imaging lens assembly. It can be seen from FIG. 8A to FIG. 8D that the optical imaging lens assembly provided in embodiment 4 can achieve a good imaging quality.

Embodiment 5

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly includes, sequentially from an object side to an image side along an optical axis: a first lens E1, a second lens E2, a stop STO, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

In the present embodiment, a total effective focal length of the optical imaging lens assembly satisfies f=2.95 mm, a distance along the optical axis from the object-side surface S1 of the first lens E1 to the imaging plane S17 satisfies TTL=4.41 mm, half of a diagonal length of an effective pixel area on the imaging plane S17 satisfies ImgH=2.85 mm, half of a maximal field-of-view angle of the optical imaging lens assembly satisfies Semi-FOV=32.6°, and a F number of the optical imaging lens assembly satisfies Fno=1.52.

Table 9 is a table showing basic parameters of the optical imaging lens assembly in embodiment 5, wherein the units for the radius of curvature, the thickness and the focal length are millimeter (mm).

TABLE 9

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| S1 | aspheric | 91.7727 | 0.2000 | 1.68 | 19.2 | −19.68 | −99.0000 |
| S2 | aspheric | 11.6317 | 0.0895 | | | | 86.1080 |
| S3 | aspheric | 1.7086 | 0.6859 | 1.55 | 56.1 | 4.92 | |
| S4 | aspheric | 4.0313 | 0.1320 | | | | |
| STO | spherical | infinite | 0.1189 | | | | |
| S5 | aspheric | 1.1359 | 0.3000 | 1.55 | 56.1 | 7.03 | |
| S6 | aspheric | 1.4634 | 0.4997 | | | | |
| S7 | aspheric | −5.2223 | 0.2425 | 1.68 | 19.2 | −4.73 | |
| S8 | aspheric | 8.4570 | 0.0746 | | | | |
| S9 | aspheric | 16.0890 | 0.3514 | 1.55 | 56.1 | 4.19 | |
| S10 | aspheric | −2.6494 | 0.0300 | | | | |
| S11 | aspheric | 1.2321 | 0.3228 | 1.67 | 20.4 | 23.27 | −1.0000 |
| S12 | aspheric | 1.1982 | 0.6555 | | | | −1.0000 |
| S13 | aspheric | 3.4720 | 0.3000 | 1.54 | 55.9 | −14.31 | |
| S14 | aspheric | 2.3192 | 0.1957 | | | | −1.0000 |
| S15 | spherical | infinite | 0.1100 | 1.52 | 64.2 | | |
| S16 | spherical | infinite | 0.1004 | | | | |
| S17 | spherical | infinite | | | | | |

In the embodiment 5, the object-side surface and the image-side surface of any one of the first lens E1 to the seventh lens E7 are aspheric. Table 10 below shows high-order coefficients $A_4, A_6, A_8, A_{10}, A_{12}, A_{14}, A_{16}, A_{18}$ and $A_{20}$ applicable to each aspheric surface S1-S14 in embodiment 5.

TABLE 10

| Surface number | A4 | A6 | A8 | A10 | A12 |
|---|---|---|---|---|---|
| S1 | 7.9312E−02 | 8.7188E−02 | −2.1456E−01 | 2.7265E−01 | −2.3429E−01 |
| S2 | 9.1340E−02 | 2.3587E−01 | −5.8885E−01 | 8.5563E−01 | −8.4343E−01 |
| S3 | −2.8927E−02 | 2.4331E−01 | −7.1189E−01 | 1.2978E+00 | −1.5931E+00 |
| S4 | −1.8617E−01 | 1.8912E−01 | −1.9416E−01 | 2.2698E−01 | −4.8889E−01 |
| S5 | −1.7605E−01 | 1.1991E−01 | −9.2966E−02 | −1.3198E+11 | 5.7038E+00 |
| S6 | 5.3925E−03 | −1.4898E−01 | 5.8201E−01 | −2.1118E+00 | 4.4006E+00 |
| S7 | −4.0121E−01 | 1.3531E+00 | −4.2070E+00 | 8.7636E+00 | −1.1552E+01 |
| S8 | −4.6895E−01 | 1.0527E+00 | −2.9818E+00 | 5.5775E+00 | −6.2646E+00 |
| S9 | 2.5842E−01 | −4.2414E−01 | −2.1637E−01 | 1.3182E+00 | −2.0844E+00 |
| S10 | 3.0565E−01 | −4.0715E−01 | 6.8972E−01 | −1.3315E+00 | 1.5515E+00 |
| S11 | −2.7503E−01 | −6.7155E−02 | 2.9983E−01 | −4.3355E−01 | 3.7860E−01 |
| S12 | −2.8203E−01 | 8.5570E−02 | −1.2891E−02 | 1.7945E−03 | −3.6234E−03 |
| S13 | −1.8431E−01 | −3.7144E−02 | 6.0399E−02 | −2.6451E−02 | 5.8035E−03 |
| S14 | −5.1047E−02 | −1.0016E−01 | 4.8644E−02 | −9.6857E−03 | 1.0556E−03 |

| Surface number | A14 | A16 | A18 | A20 |
|---|---|---|---|---|
| S1 | 1.4394E−01 | −6.0851E−02 | 1.5481E−02 | −1.7562E−03 |
| S2 | 6.0049E−01 | −2.9742E−01 | 9.0863E−02 | −1.3140E−02 |
| S3 | 1.3096E+00 | −6.8350E−01 | 2.0123E−01 | −2.5062E−02 |
| S4 | 8.2770E−01 | −7.0340E−01 | 2.2954E−01 | 0.0000E+00 |
| S5 | −1.1591E+01 | 1.2906E+01 | −7.5903E+00 | 1.8400E+00 |
| S6 | −5.4887E+00 | 3.9701E+00 | −1.5161E+00 | 2.3530E−01 |
| S7 | 9.5321E+00 | −4.8087E+00 | 1.3691E+00 | −1.7001E−01 |
| S8 | 4.4188E+00 | −1.8728E+00 | 3.8675E−01 | −1.5996E−02 |
| S9 | 1.9176E+00 | −1.0131E+00 | 2.5940E−01 | −2.0718E−02 |
| S10 | −1.0155E+00 | 3.7405E−01 | −7.2706E−02 | 5.8103E−03 |
| S11 | −2.1032E−01 | 7.0370E−02 | −1.2694E−02 | 9.4300E−04 |
| S12 | 2.0387E−03 | −4.7826E−04 | 5.1980E−05 | −2.1680E−06 |
| S13 | −6.8020E−04 | 2.7031E−05 | 3.7841E−06 | −6.0565E−07 |
| S14 | −6.8212E−05 | 2.6168E−06 | −5.5228E−08 | 4.9496E−10 |

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatic curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion at different image heights. FIG. 10D illustrates a lateral color curve of the optical imaging lens assembly according to embodiment 5, representing deviations of different image heights on an imaging plane after light passes through the optical imaging lens assembly. It can be seen from FIG. 10A to FIG. 10D that the optical imaging lens assembly provided in embodiment 5 can achieve a good imaging quality.

Embodiment 6

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly includes, sequentially from an object side to an image side along an optical axis: a first lens E1, a second lens E2, a stop STO, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a concave surface, and an image-side surface S2 thereof is a convex surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a concave surface, and an image-side surface S8 thereof is a convex surface. The fifth lens E5 has a positive refractive power, an object-side surface S9 thereof is a concave surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a positive refractive power, an object-side surface S13 thereof is a convex surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

In the present embodiment, a total effective focal length of the optical imaging lens assembly satisfies f=4.16 mm, a distance along the optical axis from the object-side surface S1 of the first lens E1 to the imaging plane S17 satisfies TTL=7.04 mm, half of a diagonal length of an effective pixel area con the imaging plane S17 satisfies ImgH=3.10 mm, half of a maximal field-of-view angle of the optical imaging lens assembly satisfies Semi-FOV=30.7°, and a F number of the optical imaging lens assembly satisfies Fno=1.80.

Table 11 is a table showing basic parameters of the optical imaging lens assembly in embodiment 6, wherein the units for the radius of curvature, the thickness and the focal length are millimeter (mm).

TABLE 11

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | spherical | infinite | infinite | | | | |
| S1 | aspheric | −12.7320 | 0.8000 | 1.68 | 19.2 | 765.85 | |
| S2 | aspheric | −12.7425 | 0.0300 | | | | |
| S3 | aspheric | 2.2913 | 0.9259 | 1.55 | 56.1 | 12.63 | |
| S4 | aspheric | 2.9420 | 0.2850 | | | | |
| STO | spherical | infinite | 0.1203 | | | | |
| S5 | aspheric | 2.9205 | 0.6376 | 1.55 | 56.1 | 4.91 | |
| S6 | aspheric | −30.2747 | 0.7880 | | | | |
| S7 | aspheric | −2.5653 | 0.4701 | 1.68 | 19.2 | −7.86 | |
| S8 | aspheric | −5.3166 | 0.0300 | | | | |
| S9 | aspheric | −34.6970 | 0.6932 | 1.55 | 56.1 | 26.45 | |
| S10 | aspheric | 24.9124 | 0.0300 | | | | |
| S11 | aspheric | 2.0187 | 0.5739 | 1.67 | 20.4 | 10.26 | −1.0000 |
| S12 | aspheric | 2.5385 | 0.1801 | | | | −1.0000 |
| S13 | aspheric | 2.4557 | 0.7363 | 1.54 | 55.9 | 163.33 | −1.0000 |
| S14 | aspheric | 2.2619 | 0.4715 | | | | −1.0000 |
| S15 | spherical | infinite | 0.1100 | 1.52 | 64.2 | | |
| S16 | spherical | infinite | 0.1619 | | | | |
| S17 | spherical | infinite | | | | | |

In the embodiment 6, the object-side surface and the image-side surface of any one of the first lens E1 to the seventh lens E7 are aspheric. Table 12 below shows high-order coefficients $A_4, A_6, A_8, A_{10}, A_{12}, A_{14}, A_{16}, A_{18}$ and $A_{20}$ applicable to each aspheric surface S1-S14 in embodiment 6.

TABLE 10

| Surface number | A4 | A6 | A8 | A10 | A12 |
|---|---|---|---|---|---|
| S1 | 1.9401E−02 | −6.2348E−03 | 4.9209E−03 | −2.8311E−03 | 1.1089E−03 |
| S2 | 2.6383E−02 | −8.5991E−03 | 2.1156E−02 | −2.6567E−02 | 2.0367E−02 |
| S3 | −1.5831E−02 | 1.1030E−02 | −5.4585E−03 | −1.4039E−03 | 4.2251E−03 |
| S4 | −4.8314E−02 | 1.7593E−02 | −4.2764E−02 | 9.1566E−02 | −1.1618E−01 |
| S5 | −1.4470E−02 | 6.1054E−03 | −2.8239E−02 | 4.6093E−02 | −4.9887E−02 |
| S6 | −6.8881E−03 | −3.2069E−02 | 6.8834E−02 | −1.0519E−01 | 9.9745E−02 |
| S7 | −9.3653E−02 | 6.8307E−02 | −1.2736E−01 | 2.6266E−01 | −3.4595E−01 |
| S8 | 4.3333E−02 | −3.1061E−01 | 4.5283E−01 | −4.1300E−01 | 2.7125E−01 |
| S9 | 1.8746E−01 | −3.4427E−01 | 3.7563E−01 | −2.9293E−01 | 1.6415E−01 |
| S10 | 2.6238E−02 | 2.3418E−03 | 3.8237E−03 | −2.3501E−02 | 2.1949E−02 |
| S11 | −1.6232E−02 | −3.9623E−02 | 1.6968E−02 | 7.6172E−04 | −4.5067E−03 |
| S12 | 2.0658E−02 | −8.0981E−02 | 5.4778E−02 | −2.3208E−02 | 6.1920E−03 |
| S13 | −9.5934E−02 | 1.9466E−02 | −3.7099E−03 | 9.2233E−04 | −1.6789E−04 |
| S14 | −8.4874E−02 | 2.4278E−02 | −5.7622E−03 | 9.9435E−04 | −1.1428E−04 |

| Surface number | A14 | A16 | A18 | A20 |
|---|---|---|---|---|
| S1 | −2.8882E−04 | 4.7490E−05 | −4.4520E−06 | 1.7956E−07 |
| S2 | −9.6431E−03 | 2.7524E−03 | −4.3247E−04 | 2.8474E−05 |
| S3 | −2.9636E−03 | 1.0527E−03 | −1.9328E−04 | 1.4545E−05 |
| S4 | 8.3264E−02 | −3.1220E−02 | 4.8107E−03 | 0.0000E+00 |
| S5 | 3.4289E−02 | −1.4185E−02 | 3.2020E−03 | −2.9341E−04 |
| S6 | −5.9431E−02 | 2.1764E−02 | −4.4868E−03 | 4.0009E−04 |
| S7 | 2.9086E−01 | −1.4836E−01 | 4.1143E−02 | −4.7261E−03 |
| S8 | −1.2453E−01 | 3.7395E−02 | −6.6415E−03 | 5.3733E−04 |
| S9 | −6.4780E−02 | 1.7007E−02 | −2.6525E−03 | 1.8477E−04 |
| S10 | −1.0017E−02 | 2.5311E−03 | −3.3708E−04 | 1.8415E−05 |
| S11 | 2.0990E−03 | −4.5254E−04 | 4.8430E−05 | −2.0780E−06 |
| S12 | −1.0080E−03 | 9.6095E−05 | −4.8837E−06 | 1.0095E−07 |
| S13 | 1.8301E−05 | −1.1606E−06 | 3.9901E−08 | −5.7802E−10 |
| S14 | 8.3785E−06 | −3.7454E−07 | 9.2829E−09 | −9.7666E−11 |

Figure 12A:
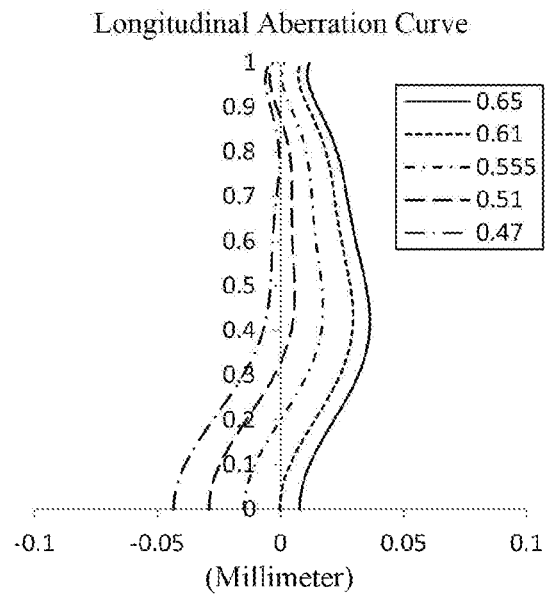
FIGS. 12A-12D illustrate a longitudinal aberration curve, an astigmatic curve, a distortion curve and a lateral color curve of the optical imaging lens assembly according to embodiment 6, respectively.
Figure 12B:
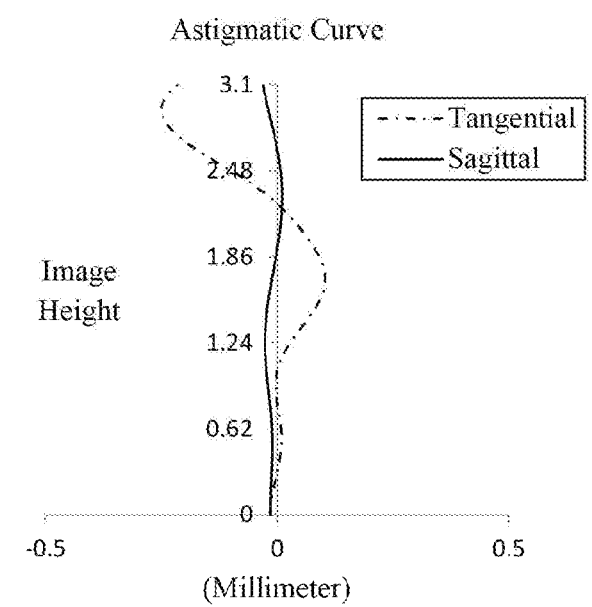
Figure 12C:
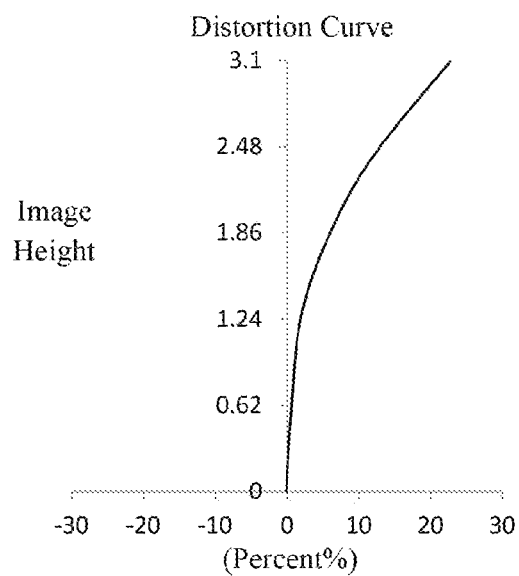
Figure 12D:
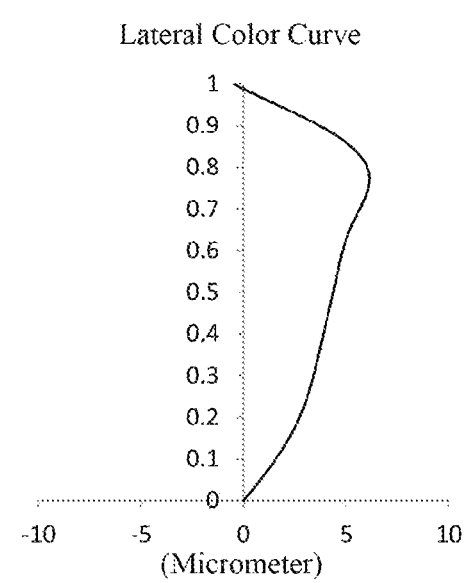

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatic curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion at different image heights. FIG. 12D illustrates a lateral color curve of the optical imaging lens assembly according to embodiment 6, representing deviations of different image heights on an imaging plane after light passes through the optical imaging lens assembly. It can be seen from FIG. 12A to FIG. 12D that the optical imaging lens assembly provided in embodiment 6 can achieve a good imaging quality.

In view of the above, embodiments 1 to 6 correspondingly satisfy the relationship shown in Table 13 below.

TABLE 13

| Conditional/Embodiment | 1 | 2 | 3 | 4 | 5 | 6 |
|---|---|---|---|---|---|---|
| $\tan^2$(Semi-FOV) | 1.04 | 0.92 | 0.97 | 0.79 | 0.41 | 0.35 |
| f3/f | 1.46 | 1.38 | 1.21 | 2.07 | 2.38 | 1.18 |
| R13/R14 | 1.71 | 1.76 | 1.55 | 1.59 | 1.50 | 1.09 |
| f4/R7 | 2.57 | 3.09 | 2.40 | 3.21 | 0.91 | 3.06 |
| T67/T34 | 1.05 | 0.79 | 1.06 | 0.43 | 1.31 | 0.23 |
| f/R11 | 2.01 | 1.72 | 1.80 | 1.25 | 2.40 | 2.06 |
| 10*CT3/ImgH | 1.50 | 1.84 | 2.27 | 1.53 | 1.05 | 2.06 |
| SAG41/SAG42 | 1.13 | 1.36 | 1.33 | 1.39 | 1.60 | 1.19 |
| (DT11 + DT12)/(DT11 − DT12) | 13.86 | 9.60 | 7.98 | 19.29 | 15.48 | 10.27 |
| (CT5 + CT4)/(CT5 − CT4) | 2.71 | 2.38 | 4.69 | 2.25 | 5.45 | 5.21 |

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly comprising, sequentially from an object side to an image side of the optical imaging lens assembly along an optical axis:
   a first lens, having a refractive power;
   a second lens, having a refractive power with a convex object-side surface and a concave image-side surface;
   a third lens, having a positive refractive power with a convex object-side surface;
   a fourth lens, having a negative refractive power with a concave object-side surface;
   a fifth lens, having a refractive power;
   a sixth lens, having a refractive power with a convex object-side surface and a concave image-side surface, and wherein at least one of the object-side surface and the image-side surface of the sixth lens has an inflection point; and
   a seventh lens, having a refractive power with a convex object-side surface and a concave image-side surface, and wherein at least one of the object-side surface and the image-side surface of the seventh lens has an inflection point;
   wherein a total effective focal length f of the optical imaging lens assembly and a radius of curvature R11 of the object-side surface of the sixth lens satisfy 1.00<f/R11<2.50;
   a maximum effective radius DT11 of an object-side surface of the first lens and a maximum effective radius DT12 of an image-side surface of the first lens satisfy 7.50<(DT11+DT12)/(DT11−DT12)<19.50; and
   a radius of curvature R13 of the object-side surface of the seventh lens and a radius of curvature R14 of the image-side surface of the seventh lens satisfy 1.00<R13/R14<2.00.

2. The optical imaging lens assembly according to claim 1, wherein half of a maximal field-of-view angle Semi-FOV of the optical imaging lens assembly satisfies 0.3<tan 2(Semi-FOV)<1.2.

3. The optical imaging lens assembly according to claim 1, wherein an effective focal length f3 of the third lens and the total effective focal length f of the optical imaging lens assembly satisfy 1.00<f3/f<2.50.

4. The optical imaging lens assembly according to claim 1, wherein the optical imaging lens assembly further comprises a stop, and the stop is disposed between the second lens and the third lens.

5. The optical imaging lens assembly according to claim 1, wherein a spaced interval T67 between the sixth lens and the seventh lens along the optical axis and a spaced interval T34 between the third lens and the fourth lens along the optical axis satisfy 0.20<T67/T34<1.50.

6. The optical imaging lens assembly according to claim 1, wherein a center thickness CT3 of the third lens along the optical axis and half of a diagonal length ImgH of an effective pixel area on the imaging plane of the optical imaging lens assembly satisfy 1.00<10*CT3/ImgH<2.50.

7. The optical imaging lens assembly according to claim 1, wherein a distance SAG41 along the optical axis from an intersection of the object-side surface of the fourth lens and the optical axis to a vertex of an effective radius of the object-side surface of the fourth lens and a distance SAG42 along the optical axis from an intersection of an image-side surface of the fourth lens and the optical axis to a vertex of an effective radius of the image-side surface of the fourth lens satisfy 1.00<SAG41/SAG42<2.00.

8. The optical imaging lens assembly according to claim 1, wherein a center thickness CT4 of the fourth lens along the optical axis and a center thickness CT5 of the fifth lens along the optical axis satisfy 2.00<(CT5+CT4)/(CT5−CT4)<5.5.

9. The optical imaging lens assembly according to claim 1, wherein an effective focal length f4 of the fourth lens and a radius of curvature R7 of the object-side surface of the fourth lens satisfy 0.50<f4/R7<3.50.

10. The optical imaging lens assembly according to claim 9, wherein half of a maximal field-of-view angle Semi-FOV of the optical imaging lens assembly satisfies 0.3<tan 2(Semi-FOV)<1.2.

11. The optical imaging lens assembly according to claim 9, wherein the optical imaging lens assembly further comprises a stop, and the stop is disposed between the second lens and the third lens.

12. The optical imaging lens assembly according to claim 9, wherein a radius of curvature R13 of the object-side surface of the seventh lens and a radius of curvature R14 of the image-side surface of the seventh lens satisfy 1.00<R13/R14<2.00.

13. The optical imaging lens assembly according to claim 9, wherein a spaced interval T67 between the sixth lens and the seventh lens along the optical axis and a spaced interval T34 between the third lens and the fourth lens along the optical axis satisfy 0.20<T67/T34<1.50.

14. The optical imaging lens assembly according to claim 9, wherein an effective focal length f3 of the third lens and the total effective focal length f of the optical imaging lens assembly satisfy 1.00<f3/f<2.50.

15. The optical imaging lens assembly according to claim 9, wherein a center thickness CT3 of the third lens along the optical axis and half of a diagonal length ImgH of an effective pixel area on the imaging plane of the optical imaging lens assembly satisfy 1.00<10*CT3/ImgH<2.50.

16. The optical imaging lens assembly according to claim 9, wherein a distance SAG41 along the optical axis from an intersection of the object-side surface of the fourth lens and the optical axis to a vertex of an effective radius of the object-side surface of the fourth lens and a distance SAG42 along the optical axis from an intersection of an image-side surface of the fourth lens and the optical axis to a vertex of an effective radius of the image-side surface of the fourth lens satisfy 1.00<SAG41/SAG42<2.00.

17. The optical imaging lens assembly according to claim 9, wherein a maximum effective radius DT11 of an object-side surface of the first lens and a maximum effective radius DT12 of an image-side surface of the first lens satisfy 7.50<(DT11+DT12)/(DT11−DT12)<19.50.

18. The optical imaging lens assembly according to claim 9, wherein a center thickness CT4 of the fourth lens along the optical axis and a center thickness CT5 of the fifth lens along the optical axis satisfy 2.00<(CT5+CT4)/(CT5−CT4)<5.5.

* * * * *